United States Patent
Benson et al.

[15] 3,681,443
[45] Aug. 1, 1972

[54] RETARDATION OF FORMATION OF COLOR-FORMING BODIES IN ALKYLARYL SULFONIC ACIDS

[72] Inventors: Albert Benson, Fairlawn; Marvin Mausner, Teaneck, both of N.J.

[73] Assignee: Witco Chemical Corporation, New York, N.Y.

[22] Filed: May 21, 1969

[21] Appl. No.: 826,712

[52] U.S. Cl. ........ 260/505 P, 260/505 R, 260/505 E, 203/6
[51] Int. Cl. ........................................... C07c 143/24
[58] Field of Search .... 260/674, 505 P, 505 R, 505 E

[56] References Cited

UNITED STATES PATENTS

| | | | |
|---|---|---|---|
| 2,885,453 | 5/1959 | Fishel | 260/674 |
| 3,042,713 | 7/1962 | Schar | 260/505 |
| 3,446,867 | 5/1969 | Kerfoot et al. | 260/505 |

*Primary Examiner*—Leon Zitver
*Assistant Examiner*—A. Siegel
*Attorney*—Wallenstein, Spangenberg, Hattis & Strampel

[57] ABSTRACT

Alkylaryl sulfonic acids, exemplified by $C_9$ to $C_{15}$ alkylbenzene sulfonic acids, containing small proportions of $\alpha$, $\beta$-unsaturated carboxylic acids, such as maleic anhydride, which function to inhibit formation of color-forming bodies in said sulfonic acids during processing, aging and/or heating thereof. The sulfonation of the alkylaryl hydrocarbons is carried out with sulfur trioxide, particularly in a liquid sulfur dioxide medium, and the $\alpha$, $\beta$-unsaturated carboxylic acids are advantageously added after the completion or substantial completion of the sulfonation reaction proper.

6 Claims, No Drawings

RETARDATION OF FORMATION OF COLOR-FORMING BODIES IN ALKYLARYL SULFONIC ACIDS

Our invention is directed to improvements in the production of alkylaryl sulfonic acids, notably in regard to retarding the formation therein of color-forming bodies during processing or on aging and/or heating of said sulfonic acids.

It is well known that, in the sulfonation of alkylaryl hydrocarbons, color bodies and color-forming bodies are obtained which give rise to color bodies upon processing, aging and/or heating of the sulfonated alkylaryl hydrocarbons. These color bodies and color-forming bodies are objectionable, and various approaches have, accordingly, been suggested to overcome such objections. Illustrative of such approaches are those disclosed, for instance, in such U.S. Pat. Nos. 2,694,086; 2,880,235; 3,042,713 and 3,068,279; and in British Pat. No. 903,204. So-called high ratio alkylaryl sulfonic acids prepared by the sulfur trioxide sulfonation of alkylaryl hydrocarbons, specifically, long chain alkylbenzenes, are particularly prone to form color bodies on aging. Moreover, in their neutralized form, for instance, in the form of their sodium salts, said alkylaryl sulfonates show a rather pronounced acid or pH drift.

We have discovered that the incorporation of small or minor amounts of $\alpha, \beta$-unsaturated carboxylic acids into the alkylaryl sulfonic acids is highly effective to inhibit objectionable coloration of said alkylaryl sulfonic acids and, more particularly, to retard or inhibit the formation of color-forming bodies in said sulfonic acids. The color bodies or color-forming bodies the retardation or inhibition of which our invention is concerned with are those which result from the sulfonation of alkylaryl hydrocarbons with sulfur trioxide. We have also discovered that the utilization of such $\alpha, \beta$-unsaturated carboxylic acids effectively inhibits or prevents so-called acid or pH drift in the neutralized alkylaryl sulfonated solutions. The matter of acid or pH drift is discussed and one approach to overcoming it is disclosed in U.S. Pat. No. 2,928,867. By virtue of our invention, we obtain, concomitantly, retardation or inhibition of color bodies and color-forming bodies and, also, the inhibition or prevention of pH or acid drift in the neutralized alkylaryl sulfonic acids, and we accomplish this in a most simple manner in no way disclosed nor suggested in said U.S. Pat. No. 2,928,867 nor in any other patent or publication of which we are aware.

The $\alpha, \beta$-unsaturated carboxylic acids which we have found to be effective for the purposes of our present invention, as we have indicated above, must be soluble in the alkylaryl sulfonic acid. Illustrative examples of such $\alpha, \beta$-unsaturated carboxylic acids (which includes anhydrides thereof) are fumaric acid, maleic acid, maleic anhydride, citraconic acid and mesaconic acid. Especially satisfactory is maleic anhydride. As stated above, only small or minor amounts of the $\alpha, \beta$-unsaturated carboxylic acids are required to be used. In general, the amounts will fall within the range of about 0.25 or 0.3 to about 2.5 percent, based on the weight of the alkylarylsulfonic acid or sulfonate, particularly satisfactory in most cases being from about 0.4 to 0.6 percent, about 0.5 percent being a good average.

Carboxylic acids such as formic acid, acetic acid, oxalic acid, succinic acid, succinic anhydride, phthalic anhydride, malonic acid, benzoic acid, naphthoic acid, salicylic acid and azelaic acid are unsatisfactory and ineffective to achieve the desirable objectives of our invention. These acids, of course, are not $\alpha, \beta$-unsaturated carboxylic acids. While certain of said acids, specifically, acetic acid, malonic acid, benzoic acid and azelaic acid, have been described (in U.S. Pat. No. 2,831,020) as being useful in inhibiting the formation of sulfones in the sulfonation of alkylaryl hydrocarbons using sulfur trioxide dissolved in liquid sulfur dioxide as the sulfonating agent, the said carboxylic acids, as indicated above, are unsatisfactory and ineffective to achieve the objectives of our present invention.

The $\alpha, \beta$-unsaturated carboxylic acid or acids can be added to the finished alkylaryl sulfonic acids or, alternatively, at a stage prior to the separation of a part or of all of the sulfur dioxide from the reacted mixture containing the alkylaryl sulfonic acid, in those instances in which liquid sulfur dioxide is used as the carrier medium for the sulfur trioxide. It is particularly desirable to add said $\alpha, \beta$-unsaturated carboxylic acid or acids at the end of the sulfonation reaction just prior to distilling or removing of the sulfur dioxide, or after a part of said sulfur dioxide has been distilled or removed from the sulfonated reacted mixture.

The alkylaryl hydrocarbons which are sulfonated in accordance with our invention, and the resulting alkylaryl sulfonic acids, which are admixed with the $\alpha, \beta$-unsaturated carboxylic acids pursuant to our invention, can be represented by the respective formulas:

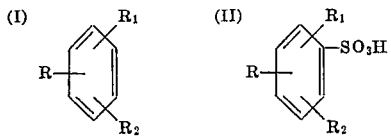

where R is predominately a $C_9$ to $C_{20}$ branched chain or a straight chain (or linear) alkyl radical, $R_1$ is selected from the group consisting of hydrogen and predominately $C_9$ to $C_{20}$ branched chain or straight chain (or linear) alkyl radicals, and $R_2$ is selected from the group consisting of hydrogen and predominately $C_1$ to $C_4$ alkyl radicals. By "predominately" we mean substantially entirely except for small percentages of hydrocarbon fractions outside of said carbon content ranges, for instance, up to several percent, say up to about 5 percent, which may be present and which do not unduly adversely affect the uses of the alkylaryl sulfonic acids (after neutralization) for their intended purposes, which are, primarily, as detergents, emulsifiers and other surfactant purposes. The $C_9$ to $C_{20}$ alkyl radicals include, for instance, branched chain as well as straight chain (or linear) nonyl, decyl, undecyl, dodecyl, tridecyl, tetradecyl, pentadecyl, hexadecyl, heptadecyl and octadecyl radicals as well as mixture thereof, particularly desirable being those which are predominately dodecyl, tridecyl and pentadecyl or mixtures thereof. The $C_1$ to $C_4$ alkyl radicals comprise methyl, ethyl, n-propyl, isopropyl, n-butyl, isobutyl and tert-butyl radicals.

No novelty is claimed in the sulfonation procedure per se which is utilized in the production of the alkylaryl sulfonic acids. Sulfur trioxide in air or other carrier media, including, specifically, sulfur trioxide dissolved in liquid sulfur dioxide are well known sulfonating systems and are disclosed in numerous patents and other printed publications, illustrative of said patents being U.S. Pat. No. 2,831,020. It is especially advantageous, as stated above, to utilize liquid sulfur dioxide as to the carrier medium for the sulfur trioxide because of the solubility of maleic anhydride in liquid sulfur dioxide.

The alkylaryl acids can be neutralized in well known ways to form, for instance, the sodium, potassium, ammonium, calcium, monoethanolamine, diethanolamine, triethanolamine, isopropanolamine, ethylamine, isopropylamine, cyclohexylamine, dicyclohexylamine or other amine or other salts.

The following examples are illustrative of the practice of our invention and are not to be construed as in any way limitative thereof since various changes can be made in the light of the guiding principles and teachings disclosed herein.

EXAMPLE 1

One hundred twenty-three g. of a straight chain dodecyl benzene is charged to a reaction flask and cooled to −10° C. There is then slowly charged into said reaction flask a mixture of 41.2 g liquid sulfur trioxide in 377 g of liquid sulfur dioxide and the reaction mass is mixed for about one-half hour. Sulfur dioxide is then distilled out of the sulfonated reacted mixture until the pot temperature reaches 10° to 15° C. Thereupon, 0.82 g of maleic anhydride is added and admixed for about one-half hour. The remaining sulfur dioxide is then distilled from the sulfonated reacted mixture. The dodecyl benzene sulfonic acid had a good color which persisted over a period of several days.

EXAMPLE 2

One hundred g of a so-called high ratio branched chain dodecyl benzene sulfonic is admixed at room temperature with 0.5 g of maleic anhydride until the latter is dissolved.

EXAMPLE 3

One hundred g of a so-called high ratio straight chain tridecyl benzene sulfonic acid is admixed at room temperature with 0.6 g of maleic anhydride until the latter is dissolved.

EXAMPLE 4

One hundred g of a straight chain dodecyl toluene sulfonic acid at 40° C is mixed with 0.5 g of fumaric acid until the latter is dissolved.

As illustrative of the achievements of our invention, reference is made in Table I to an accelerated aging test on the neat material, at 55°–60° C, in regard to inhibition of coloration in the case of a branched chain (namely, tetrapropylene) dodecylbenzene sulfonic acid. Color is measured in aqueous solution containing 10 percent (active) of said dodecylbenzene sulfonic acid, utilizing a Klett-Summerson colorimeter.

TABLE I

Klett-Summerson Reading

| Time | Blank | 0.5% Maleic Anh. | 2% Maleic Anh. |
| --- | --- | --- | --- |
| – | 235 | 175 | 159 |
| 4 hrs. | 310 | 200 | 200 |
| 20 hrs. | 420 | 235 | 234 |
| 2 days | 465 | 256 | 230 |
| 5 days | 660 | 305 | 300 |
| 6 days | 800 | 360 | 335 |
| 12 days | 950+ | 450 | 440 |
| 20 days* | – | 770 | 670 |

*Blank removed from test.

In the following Table II, the results of tests are shown on the neutralized (sodium salt) 10 percent content of sodium dodecylbenzene sulfonic acid in which the dodecyl radical was derived from the same source as in the tests of Table I and 0.5 percent maleic anhydride was utilized:

TABLE II

| Time - Days | pH |
| --- | --- |
| 0 | 7.5 |
| 1 | 7.5 |
| 2 | 7.7 |
| 5 | 7.5 |
| 20 | 7.9 |

In the following Table III, the results of Klett-Summerson color tests are shown on the straight chain dodecylbenzene sulfonic acid produced as described in the above Example 1 and aged at room temperature for 8 days, as well as where maleic acid and where fumaric acid were used in place of the maleic anhydride:

TABLE III

| $\alpha, \beta$-unsaturated carboxylic acid at 0.5% | Color of 10% Active Solutions |
| --- | --- |
| Blank | 432 |
| Maleic acid | 395 |
| Maleic anhydride | 410 |
| Fumaric acid | 400 |

In an extension of said tests, using 0.5 percent of other carboxylic acids not of the $\alpha, \beta$-unsaturated carboxylic acid type, color readings were 425 for each of succinic acid and succinic anhydride, 475 for oxalic acid, and 440 for phthalic anhydride.

In the following Table IV, the results of tests in regard to acid or pH drift were carried out on aqueous solution containing 10 percent of a sodium salt of a linear dodecylbenzene sulfonic acid and, respectively, 0.5 and 2 percent maleic anhydride.

TABLE IV pH

| Time | Blank | 0.5% Maleic Anh. | 2% Maleic Anh. |
| --- | --- | --- | --- |
| Start | 7.2 | 7.5 | 7.25 |
| 3 days | 6.7 | 7.2 | 7.3 |
| 6 days | 6.5 | 7.2 | 7.3 |
| 13 days | 6.2 | 7.1 | 7.2 |
| 23 days | 5.9 | 7.1 | 7.3 |
| 43 days | 5.5 | 7 | 7.2 |

We claim:

1. A composition comprising an alkylaryl sulfonic acid corresponding to the formula:

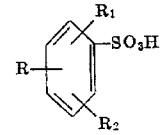

where R is a $C_9$ to $C_{20}$ alkyl radical, $R_1$ is selected from the group consisting of hydrogen and $C_9$ to $C_{20}$ alkyl radicals, and $R_2$ is selected from the group consisting of hydrogen and $C_1$ and $C_4$ alkyl radicals, in admixture with a color-inhibiting amount of at least one $\alpha$, $\beta$-unsaturated carboxylic acid selected from the class consisting of fumaric acid, maleic acid, citraconic acid, mesaconic acid, and anhydrides thereof.

2. The composition of claim 1, in which the alkylaryl hydrocarbon is a monoalkylbenzene having from nine to 15 carbon atoms in the alkyl group.

3. The composition of claim 2, in which the color-inhibiting material is maleic anhydride in amount from 0.3 to 0.7 percent by weight of said sulfonic acid.

4. In the process of sulfonating alkylaryl hydrocarbons corresponding to the formula:

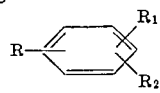

where R is a $C_9$ to $C_{20}$ alkyl radical, $R_1$ is selected from the group consisting of hydrogen and predominately $C_9$ to $C_{20}$ alkyl radicals, and $R_2$ is selected from the group consisting of hydrogen and predominately $C_1$ to $C_4$ alkyl radicals, in which the sulfonation is carried out with sulfur trioxide dissolved in sulfur dioxide, and wherein, after the sulfonation, the sulfur dioxide is removed by distillation from the reaction mixture, the improvement which comprises effecting such removal of at least a part of the sulfur dioxide in the presence of a color-inhibiting amount of at least one $\alpha$, $\beta$-unsaturated carboxylic acid selected from the class consisting of fumaric acid, maleic acid, citraconic acid, mesaconic acid, and anhydrides thereof.

5. The process of claim 4, in which the alkylaryl hydrocarbon is a monoalkylbenzene having from nine to 15 carbon atoms in the alkyl group.

6. The process of claim 5, in which the color-inhibiting material is maleic anhydride in amount from 0.3 to 0.7 percent by weight of said sulfonic acid.

* * * * *